Aug. 23, 1966 R. J. ALBERT 3,267,519
DIFFERENTIAL LOCK NUT ADJUSTER
Filed Oct. 23, 1964
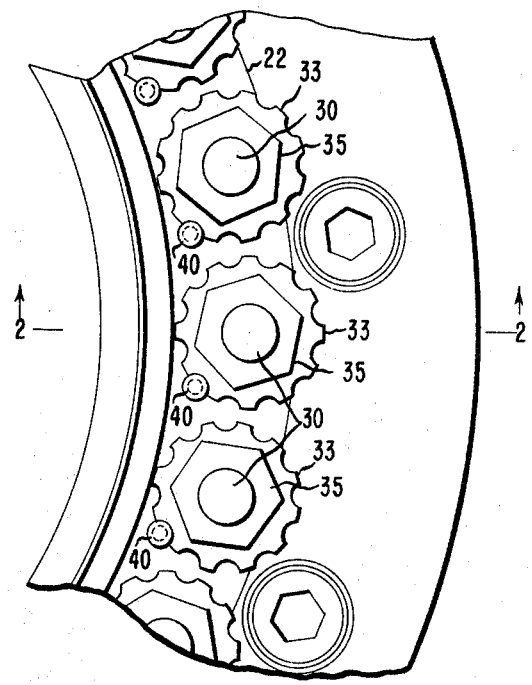
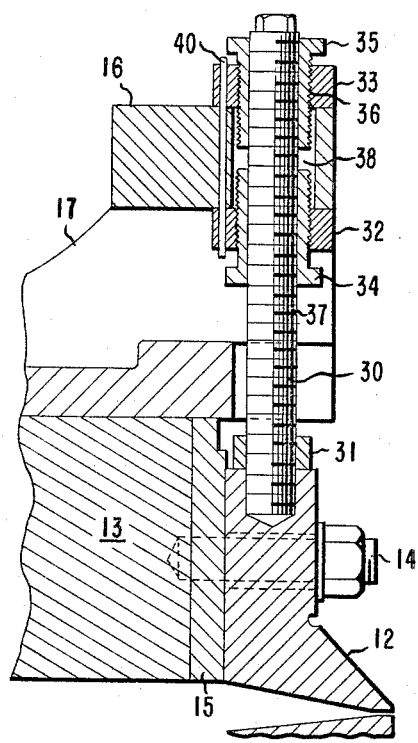
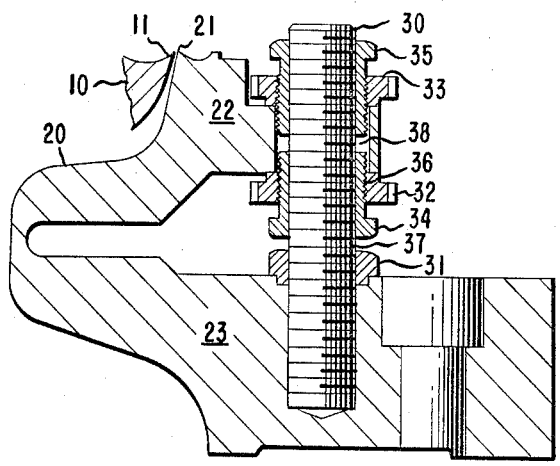
INVENTOR
RICHARD JAMES ALBERT
BY *Robert W. Black*
ATTORNEY

United States Patent Office 3,267,519
Patented August 23, 1966

3,267,519
DIFFERENTIAL LOCK NUT ADJUSTER
Richard James Albert, Clinton, Iowa, assignor to E. I. du Pont de Nemours and Company, Wilmington, Del., a corporation of Delaware
Filed Oct. 23, 1964, Ser. No. 406,049
7 Claims. (Cl. 18—12)

This invention relates to adjustment mechanisms and, more particularly, to mechanisms for precisely adjusting the lips of an extrusion orifice in an apparatus for the extrusion of continuous films.

The use of fine, precision adjustment mechanisms is a prerequisite for many mechanical processes and apparatus.

An important fine, precision adjustment mechanism use is in the adjustment of orifice or slot widths in extrusion dies. Gauge uniformity of both cast tube and flat film in a film making process is a major quality prerequisite. A primary approach to improving gauge has been to vary the extrusion opening. Extremely fine, accurate, positive lip movement is required to effect a small change in the 50 mils or less opening in the case of most extrusion dies. Fine adjustments of less than 0.1 mil are desirable in many extrusion dies.

The existing designs of such adjustment mechanisms, however, all suffer from several disadvantages. Lock nuts have been perhaps the most popular adjustment used since they are simple and inexpensive. However, they are necessarily coarse and insensitive (not positively responsive), thus requiring great skill in their manipulation. Differential type screw mechanisms, even with spring preloadings suffer from high loading and mechanical looseness resulting from necessary clearances. Lever, wedge and toggle mechanisms are available also, with all of these systems providing fine adjustments; but, are susceptible to drift and instability and thus do not provide accurate, positive response.

The following drawbacks are noted, in particular with reference to known differential type screw mechanisms: (1) Occurrence of "dead spots" (null point) causing a lag in response of thickness adjustment in the movement of the adjustment bolt. (2) Instability of extrusion orifices to pressure and temperature changes. (3) Because of "dead spots," the specific bolt position does not represent a specific lip position and thus no visual indication of the shape of the orifice lip is possible and it is difficult to return the orifice lip to its initial shape. (4) In order to minimize instability due to "dead spots," no separation of the adjustment bolt segments by machined slot has been permissible. As a consequence, overstrain of orifice lips result due to the excessively high load required on the adjustable bolt; moreover, very high loads are required for any adjustment of the hopper lip, frequently resulting in stripping adjusting bolts.

It is, therefore, an object of the present invention to provide an adjustment mechanism of the differential screw type.

It is a further object of this invention to provide a differential screw adjustment mechanism for precisely adjusting the lips of an extrusion orifice in an apparatus for the extrusion of continuous films which overcomes the above drawbacks. These and other objects will appear hereinafter.

These and other important objects and advantages of the invention will become apparent as the same is more fully understood from the following description, which, taken in connection with the accompanying drawings, discloses preferred embodiments of the invention wherein:

FIGURE 1 is a plan view of a partial section of an outer circular die;

FIGURE 2 is a cross-sectional view taken along line 2—2 of FIGURE 1 of a single side of a circular extrusion die, wherein but one of a plurality of differential lock nut adjuster mechanisms is used; and, FIGURE 3 is a cross-sectional view of one of a plurality of differential lock nut adjuster mechanisms used with a flat film extrusion die in which the mechanism is located primarily at the stationary body member.

Referring to FIGURES 1 and 2, the adjustment mechanism is adapted to a typical circular orifice extrusion apparatus: Two main body members, 10 and 20, an inner fixed body member 10 having a fixed lip 11 and an outer flexible body member 20 having an adjustable lip 21. It is the outer body member 20 into which the mechanism is placed to cause movement of the adjustable lip. The outer flexible body member, which is substantially U-shaped or two parallel, spaced body members, is constructed of a material which permits deflection of the upper arm 22 to or away from the lower stationary arm 23 with concomitant movement of the lip edge 21.

Each of the differential lock nut adjuster mechanisms adapted to provide adjustment of the lip edge 21 comprises a stationary machine screw-threaded stud 30 mounted on and extending from the lower arm 23 of flexible body member 20. Preferably, as shown, this stud is removably mounted in lower arm 23 by screw-thread engagement and locked into position by lock nut 31.

In register with and adapted to receive the upper portion of the stud 30 extending through opening 38 in upper flexible arm 22, are two scalloped head lock nuts 32 and 33 engaging the opposite faces of opening 38 of the upper arm 22 of the outer flexible body member 20. The effective diameter of the scallops is substantially that of lock pin 40. Two adjusting nuts 34 and 35 (in this illustration each comprises a head having flattened surfaces adapted to engage a wrench) threadably engage both stud and lock nuts, the internal threads engaging the stud and the external threads the lock nuts. The pitch of the external threads 36 of the adjusting nuts bears a ratio to the pitch of the internal threads 37 such that the deflectable upper arm 22 of the outer flexible body member 20 is brought closer to or forced away from the lower arm 23 a predetermined distance with each corresponding reciprocal movement of the adjusting nuts.

Thus, this illustrates an application wherein the differential lock nut adjuster mechanism is located primarily at the deflecting member.

In assembling the mechanism, the stationary machine screw-threaded stud 30 is inserted through the cylindrical opening 38 in the upper arm 22 of body member 20. An adjusting nut 34, which has had a lock nut 32 previously threaded onto its external threads 36, is threaded onto the stud 30 intermediate upper arm 22 and lower arm 23 of body member 20 and positioned appropriately. Lock nut 31 is threaded onto the stud following the adjusting nut 34, and the stud is then threaded into engagement with the lower arm 23, and locked stationary by the lock nut 31. The other adjusting nut 35, which also has had a lock nut 33 previously threaded onto its external threads 36, is threaded onto the stud projecting through the cylindrical opening and beyond the upper arm 22 positioned appropriately. The lock nuts 32 and 33, threaded onto the external threads of the adjusting nuts 34 and 35, are brought into engagement with the opposite faces of the upper arm 22 and are used to set the nominal gap of the orifices opening and are so positioned to achieve the optimum range between adjustment and adjuster. Lock pin 40 is then inserted through a hole in arm 22 into one of the scallops of lock nuts 32 and 33 to hold lock nuts 32 and 33 stationary. Then the adjusting nuts can be used to make the fine, accurate, positive adjustment and deflection of one body member with respect to the other body member with a concomitant movement of the lip edge.

In FIGURE 3, adjustable, slideable lip 12 is affixed to hopper body 13 by stud 14. Spacer 15 provides for reduced friction and assists in forming a seal between lip 12 and hopper body 13. One end of stud 30 of each adjustment mechanism is affixed to slideable lip 12 while the other end extends through opening 38 in the spaced arm 16 of holding bar 17 which is bolted to hopper body 13. The assembly and operation of the mechanism is the same as described for the mechanism shown in FIGURES 1 and 2 but illustrates an application wherein the differential lock nut adjuster mechanism is located primarily at the stationary member.

Thus, this adjuster mechanism is a development wherein two differential type screw mechanisms are used in opposition like lock nut mechanisms. The thread relationships can be selected to virtually any suitable degree of adjustment required for a given application. As a result, greater precision of adjustment is possible (not feasible with a conventional lock nut) and operation remains essentially unchanged from the conventional lock nut system (i.e., one nut is first backed off and the other is then "cinched," a corresponding amount moving one lip section as desired to increase or resist flow through an orifice).

It is to be understood, of course, that the application of the mechanism of the present invention is not restricted to film extrusion dies alone, but can be advantageously applied to any situation where fine, accurate, positive adjustment of mechanical elements is deemed mandatory. For example, it can be applied in the use of adjusting screws on doctor rolls or doctor knife in coating towers used for application of coatings to substrates, or applying emulsions. Similarly, this adjustment mechanism can improve many machines by improving alignment, roll adjustment, leveling, centering, etc. Even a lathe chuck, in very common use, can be improved through the adaptation of this differential lock nut adjuster mechanism.

Similarly, of course, the adjuster nuts need not be confirmed to any specific configuration but only need have both internal and external threads and provided suitably for adjustment. For example, the adjusting nut can be in essence a bushing having internal threads and external threads, discontinuous with machined slots or holes permitting the use of a spanner wrench for adjustment. Hand wheels or motor driven adjusting nuts, with or without interconnection to automatic gauge control devices, can also be used. Obviously one skilled in the art can choose the type most suited to his particular application.

The differential lock nut adjuster mechanism is readily accessible which is of considerable importance. In certain applications, the differential lock nut adjuster mechanism can be placed external of the mechanical elements by adaptation through the use of shaft extensions, chains, belts, etc.

The differential lock nut adjuster mechanism of the present invention overcomes the disadvantages pointed out previously which have severely limited the use of mechanisms of previously existing designs. Other advantages obtainable through the adaptation of the differential lock nut adjuster mechanism of the present invention are smoothness of turning due to the absence of flat thrust surfaces having relative motion, such as the contact surface of regular lock nuts. "Overshooting" (excessive adjusting) is essentially eliminated due to the fineness of movement and practical with the differential lock nut adjuster mechanism.

With reference to FIGURES 1 and 2, circular die having a nominal orifice opening of 35 mils is equipped with an American-Standard V Thread (fine) lock bolt and nut of 14 threads per inch adjustment mechanism. A flat (one-sixth turn) on the lock nut changes the lip opening approximately 34% per flat. If a 1% lip change is desired, a turn of 1/34 (3%) flat is required.

By converting the lock nut adjustment mechanism to one of the present invention, changes in lip opening of 3–4% per flat can be made.

| System (1″ Dia. Stud) | Inch Movement Per Flat (6 Flat Per Turn) | Percent Change (35 mil Opening) (Per Flat) | Adjustment Ratio Diff. Nut Std. Nut | Effec. TPI |
|---|---|---|---|---|
| Standard 14 TPI Lock Nut | 0.012 | 34 | 1/1 | 14 |
| Diff. Nut 14/16 TPI | 0.0015 | 4.2 | 1/8 | 112 |
| Diff. Nut 14/15 TPI | 0.0008 | 2.2 | 1/15 | 210 |
| Diff. Nut 14/14.5 TPI | 0.0004 | 1.2 | 1/29 | 406 |

By using the differential lock nut adjuster mechanism of the present invention, a high number of effective threads per inch (112 TPI to 406 TPI as noted above), which are obviously impractical to accomplish directly with finely turned threads, can be obtained. Other ratios are feasible, if required, by simply selecting appropriate thread pitch combinations.

With reference to FIGURE 3, a flat film extrusion die having a nominal 6 mil opening is equipped with lock bolt and nuts using American-Standard V Thread (fine) 20 threads per inch adjustment mechanism. A 20 TPI lock nut represents an 0.0083 inch/flat movement. To move the lips 10% requires that the lock nuts be turned only approximately 4° or 1/16 of a flat. In order to change the ratio to permit finer, accurate, positive adjustments, the standard lock bolt and nut arrangement is replaced by the differential lock nut adjuster mechanism of the present invention.

The following table shows various changes in lip opening which results using differential thread ratios based on the 0.0083 inch/flat movement with 20 TPI (nominal 6 mil opening).

| System (1″ Dia. Stud) | Inch Movement Per Flat (6 Flat Per Turn) | Percent Change (6 mil Opening) (Per Flat) | Adjustment Ratio Diff. Nut Std. Nut | Effec. TPI |
|---|---|---|---|---|
| Standard 20 TPI Lock Nut | 0.0083 | 140 | 1/1 | 20 |
| Diff. Nut 20/24 TPI | 0.0014 | 23 | 1/6 | 120 |
| Diff. Nut 20/22 TPI | 0.0008 | 13 | 1/11 | 220 |
| Diff. Nut 20/21 TPI | 0.0004 | 7 | 1/21 | 420 |
| Diff. Nut 20/20 TPI | 0.0002 | 3 | 1/42 | 820 |

Other ratios are feasible, if required, by simply selecting approximate thread pitch combinations.

What is claimed is:

1. A adjustment mechanism comprising, in combination: a first body member; a threaded stud fixedly attached to said body member; a second body member having an opening therein, said stud projecting through said opening; two internally and externally threaded adjusting nuts, the internal threads being in threaded engagement with the stud; two internally threaded lock nuts engaging the second body member on opposite faces of said opening, the internal threads being in threaded engagement with the external threads of said adjusting nuts, said adjusting nuts adapted to move one of said body members with respect to the other said body member from a predetermined position.

2. The adjustment mechanism of claim 1 wherein the pitch of the external threads of the adjusting nuts is different from the internal threads.

3. The mechanism of claim 2 wherein the lock nuts are held in fixed relationship to the second body member and to each other.

4. A mechanism for precisely adjusting the orifice lips of a tubular film extrusion apparatus comprising in combination: a circular die comprising an inner fixed body member and an outer, flexible body member comprised of a flexible arm having cylindrical openings at equally spaced intervals and a stationary arm, said inner body member and the flexible arm of said outer body member defining a circular orifice opening; a plurality of threaded studs fixedly attached to said stationary arm and extending through the openings in said flexible arm; two internally and externally threaded adjusting nuts for each stud, the internal threads being of a different pitch that the external threads and being in threaded engagement with the studs; two internally threaded lock nuts for each mechanism engaging the flexible arm on opposite faces of said openings, the internal threads being in threaded engagement with the external threads of said adjusting nuts, said adjusting nuts adapted to move said flexible arm from a predetermined position thereby varying the orifice opening.

5. A mechanism for precisely adjusting the orifice lips of a flat film extrusion apparatus comprising in combination: a body member having a lengthwise channel in its bottom surface; an adjustable lip slideably affixed to said body member adjacent said channel, said body member and said lip defining an orifice opening; a holding bar affixed to said body member, said bar having an arm spaced from said body member and with openings at spaced intervals; a plurality of threaded studs fixedly attached to said adjustable lip and extending through the openings in the arm of said holding bar; two internally and externally threaded adjusting nuts for each stud, the internal threads being of a different pitch than the external threads and being in threaded engagement with the studs; two internally threaded lock nuts for each mechanism engaging the arm of said holding bar on opposite faces of said openings, the internal threads being in threaded engagement with the external threads of said adjusting nuts, said adjusting nuts adapted to move said adjustable lip from a predetermined position thereby varying the orifice opening.

6. The mechanism of claim 4 wherein the lock nuts are held in fixed relationship to the flexible arm and to each other by a pin extending through said flexible arm into a groove on the edge of each of said lock nuts.

7. The mechanism of claim 5 wherein the lock nuts are held in fixed relationship to the arm of said holding bar and to each other by a pin extending through said arm into a groove on the edge of each of said lock nuts.

References Cited by the Examiner

UNITED STATES PATENTS

| | | | |
|---|---|---|---|
| 2,485,280 | 10/1949 | Grace | 85—1 |
| 3,039,143 | 6/1962 | Nicholson | 18—12 |
| 3,079,636 | 3/1963 | Aykanian | 18—14 |

WILLIAM J. STEPHENSON, *Primary Examiner.*